Dec. 4, 1934.    O. E. BUCKLEY    1,982,784
SUBMARINE CABLE
Filed March 17, 1930
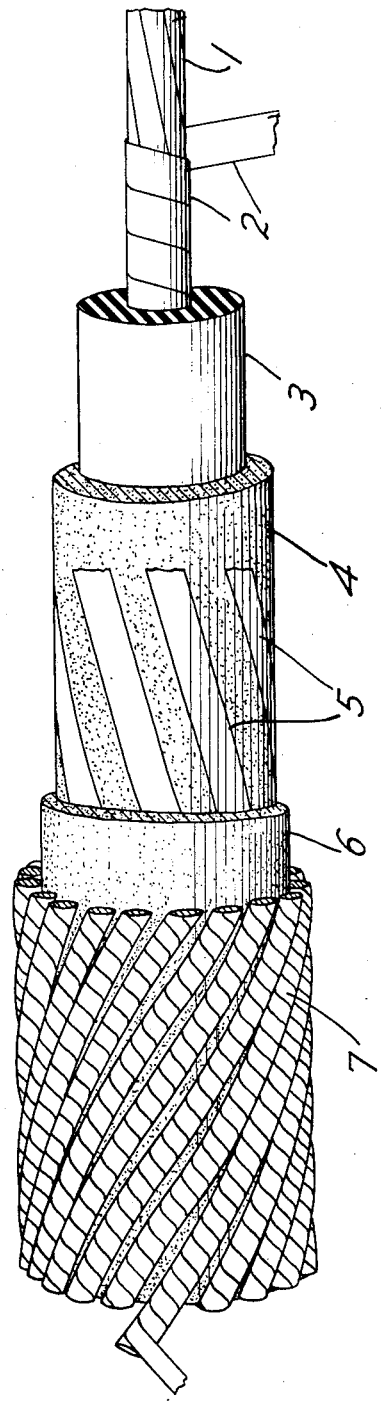
INVENTOR
O. E. BUCKLEY
BY J. W. Schmied
ATTORNEY Patented Dec. 4, 1934

1,982,784

UNITED STATES PATENT OFFICE 1,982,784

SUBMARINE CABLE

Oliver E. Buckley, Maplewood, N. J., assignor to Bell Telephone Laboratories, Incorporated, New York, N. Y., a corporation of New York Application March 17, 1930, Serial No. 436,298
In Great Britain March 20, 1929

7 Claims. (Cl. 173—266)

This invention relates to submarine telephone and carrier cables of the type in which current is carried by a central conductor which may or may not be surrounded with magnetic material to increase its inductance and which is insulated by a layer of insulating material, for example, gutta percha or rubber or compounds of similar properties to form a cable core. With such cables the return current is carried by a surrounding armor wire and sea-water and by a special return conductor outside of the cable if such is provided. Previously the return conductor has been applied in the form of copper tapes wrapped around the core of the cable to form a helix. These copper tapes are in turn surrounded by jute and armor wires as in the case of the Key West-Havana telephone cable described in the paper by Anderegg, Martin and Kendall and published in the Journal of American Institute of Electrical Engineers for March 1922.

When it is desired to make a telephone cable of great length it is necessary to use a relatively large central conductor and it is necessary to secure a very low resistance in the outer return circuit in order to minimize the attenuation of the cable for the higher frequencies involved in transmitting telephone speech, or the high frequency currents of carrier telegraphy. Especially when cables are made in large dimensions numerous types of electrical losses are introduced which are not of serious consequence in smaller cables and shorter cables, or cables for transmitting relatively low frequency. Such losses include skin effect in the central conductor, eddy currents in the central conductor resulting from the helical shape of the concentric return conductor which is in effect a solenoidal coil, and losses in the armor wire resulting from eddy currents induced therein. If the armor wire is magnetic, as has been the case in telephone cables heretofore made, it is possible to have resistance introduced in the telephone circuit as a result of eddy currents set up in the armor wire in consequence of the armor wire being intersected by the magnetic lines of force from the central structure comprising the core with its concentric return conductor.

To minimize certain of the losses referred to above and to secure a cable of minimized attenuation for high frequency transmission the following structure is proposed:

A central conductor consisting of a solid copper wire or stranded copper wire of the usual type which may be or may not be inductively loaded, is surrounded by an insulating material as, for example, gutta percha or balata or rubber or a mixture of these substances to form the core of the cable. Surrounding the core are one or more conductors which serve to carry part of the return current but may also serve to give mechanical strength to the cable. These return conductors may be of copper or of other material combining high conductivity and high mechanical strength, as for example, copper with which other elements have been alloyed to increase its tensile strength. These return conductors may be in the form of tape or wire applied in helical form around the core of the cable. It may be placed immediately adjacent to the cable core or separated from it by a bedding of jute. The latter structure has certain mechanical advantages, and in addition gives a slightly greater inductance as a result of the increased separation of the return conductors from the central conductor.

The return conductors are surrounded with jute or other material for mechanical purposes and this is in turn surrounded by the sheathing or armor wires, the latter being applied in the opposite sense to the return conductor. The sheathing wires are wound with impregnated tape and should have mechanical properties required to give the core of the cable the necessary mechanical protection and should also be chosen with regard to their electrical properties so that the sheathing wires themselves will contribute effectively to carrying the return current. This can be accomplished by using non-magnetic sheathing wires or sheathing wires of very low magnetic permeability and of as high conductivity as possible. Materials satisfying the requirement of low magnetic permeability and at the same time possessing high tensile strength, are well known. Copper, or a copper alloy, aluminium, or an aluminium alloy may be used.

According to this invention the armor wires and the return conductor are so proportioned that each of them carries a considerable share of the return current. Being applied in opposite sense, i. e. with the armor wire having say a left hand lay and the return conductor having a right hand lay, the longitudinal component of magnetic field resulting from their helical shape, is minimized and may be reduced to zero for one frequency within the signaling range by proper proportioning of sizes of return conductor and armor wire with regard to their conductivity and geometrical structure. The longitudinal component will be small for other frequencies. Accordingly, eddy currents in the central conductor are minimized.

In cases where the eddy currents in the central conductor resulting from the helical shape of the return conductor would not be of serious consequence, it is of course, possible to arrange the return conductor and the armor wire so as to have the same sense of lay. This structure possesses, in a certain instance, a mechanical advantage.

A cable structure in accordance with the invention is shown in the drawing in which the conductor 1 is shown as the usual stranded type but may be solid. Magnetic loading tape 2 may or may not be present. If present the entire conductor and magnetic tape are thoroughly impregnated with pressure equalizing material. The insulation 3 may be gutta percha or a mixture such as deproteinized rubber, deresinated balata and Montan wax. The layer 4 of jute may or may not be used. Strips 5 are of copper and constitute the return conductor. A very long lay for these strips is preferable. Upon the layer of jute 6 the armor wires 7 are placed. These may be composed of hard drawn copper, bronze, aluminium, aluminium-copper alloy or equivalent high conductivity non-magnetic material of high tensile strength. The armor and the return conductor strips 5 are spiralled in opposite directions. Each carries some of the return current and the opposite spiralling reduces the longitudinal component of magnetic field linking the central conductor 1. A cable of this type is especially adapted for speech or carrier transmission in moderately deep water.

What is claimed is:

1. A submarine cable comprising a central conductor, insulation, a return conductor, and armor surrounding the return conductor and adapted to carry a portion of the return current, said armor and return conductor being spiralled and having cross sections, conductivity and geometrical configuration and relation to each other so as to each set up a magnetic field having a component which will neutralize the longitudinal component of the magnetic field set up by the other at one frequency in the signaling range.

2. A submarine telephone or other high frequency signaling cable comprising a central conductor, insulation, a spiraled return conductor outside the insulation, and a spiraled armor wire distinct from the return conductor, said armor wire being of non-magnetic good conducting material, the armor wire and the return conductor being so proportioned with respect to cross sections, conductivity and geometrical configuration and relation to each other as to each set up a magnetic field having a component which will neutralize the longitudinal component of the magnetic field set up by the other at one frequency in the signaling range.

3. A submarine cable for transmitting high frequency currents comprising a central stranded conductor, insulation surrounding said conductor, an innner conducting sheathing and an outer armor sheathing, each of said sheathings being composed of strands helically applied about said insulation with a direction of lay opposite that of the strands in the other sheathing, the strands of each of said sheathings being of highly conducting material and dimensioned to carry a large component of the return current, when connected in circuit with said central conductor and the angles of lay of said sheathings being such that the resultant of the longitudinal components of the magnetic fluxes produced by said current components is substantially zero in the region within said inner sheathing at an essential frequency.

4. A submarine cable having a central conductor, insulation thereupon, a spiraled return conductor outside of said insulation, an oppositely spiraled layer of armor wires external to said return conductor, said armor wires having a total cross-sectional area, conductivity, pitch and cross-sectional form and being at such distances from the central conductor and from the return conductor as to substantially neutralize the longitudinal component of the magnetic flux of said return conductor at an essential frequency of the signaling range when connected in circuit with said conductors.

5. A submarine cable for inclusion in a signaling circuit, comprising a central conductor for transmission in one direction, a return conductor having a plurality of strands spirally applied in a single layer around said central conductor and adapted to carry a substantial portion of the return current and effective in producing a resultant magnetic flux having a longitudinal component substantially coincident with said central conductor, and an armor having a plurality of strands spirally surrounding said return conductor in a single layer and being of non-magnetic high conductivity material and adapted to carry a substantial portion of the return current and effective in producing a resultant magnetic flux having a longitudinal component substantially coincident with said central conductor, the strands in said armor being spiralled in the direction opposite that of said return conductor, and having a pitch of spiralling and geometrical configurations such that the said two longitudinal flux components will be substantially equal and of opposite direction at a desired frequency within the signaling range.

6. A submarine cable for inclusion in a signaling circuit, comprising a central conductor for transmission in one direction, a return conductor spirally applied relative to said central conductor and adapted to carry a substantial portion of the return current and effective in producing a resultant magnetic flux having a longitudinal component at the location of said central conductor, and an armor surrounding said return conductor in a spiral formation and being of high conductivity material and adapted to carry a substantial portion of the return current and effective in producing a resultant magnetic flux having a longitudinal component at the location of said central conductor, said return conductor and said armor having dimensions and geometrical configurations and mutual relation of spiraling such that the said two longitudinal flux components will substantially neutralize each other at a desired frequency within the signaling range.

7. A submarine cable for inclusion in a signaling circuit, comprising a central conductor for transmission in one direction, a first return conductor surrounding said central conductor in a single spiral layer, a second return conductor spirally surrounding said first return conductor with the opposite direction of turn and being of non-magnetic material having high tensile strength to serve as an armor, said two return conductors being included in the signaling circuit to each carry a substantial portion of the return current, thereby being effective in producing a resultant magnetic flux having a longitudinal component substantially coincident with said central conductor, and the pitches of the spirals of said two return conductors being so related that said components will be substantially equal and opposed to each other.

OLIVER E. BUCKLEY.